United States Patent [19]

Schelinski et al.

[11] 4,397,668
[45] Aug. 9, 1983

[54] PROCESS AND DEVICES FOR HARDENING OF GLASSWARE BY ION EXCHANGE

[75] Inventors: Siegfried Schelinski, Weisswasser; Dieter Patzig, Schleife; Klaus Heinrich; Bernd Grüger, both of Weisswasser, all of German Democratic Rep.

[73] Assignee: VEB Wissenschaftlich-Technischer Betrieb Wirtschaftsglas Bad Muskau, Bad Muskau, German Democratic Rep.

[21] Appl. No.: 266,259

[22] Filed: May 22, 1981

[30] Foreign Application Priority Data

Aug. 8, 1977 [DD] German Democratic Rep. ... 200450

[51] Int. Cl.³ ...................... C03B 27/02; C03C 21/00
[52] U.S. Cl. .................................. 65/30.14; 65/115; 65/170; 65/348; 65/349; 65/375
[58] Field of Search ................... 65/30.13, 30.14, 114, 65/115, 116, 170, 348, 349, 375; 148/15, 20

[56] References Cited

U.S. PATENT DOCUMENTS 3,677,729 7/1972 Plumat ........................... 65/30.14

FOREIGN PATENT DOCUMENTS 2046611 11/1980 United Kingdom ................. 148/20

Primary Examiner—Richard V. Fisher
Attorney, Agent, or Firm—Jordan and Hamburg

[57] ABSTRACT

The present invention is directed to an apparatus and process for the ion exchange hardening of glassware by passing the glassware through a stream of molten salt. The glassware may be arranged at different levels on a conveying means, provided with perforations to allow the molten salt to fall from level to level from an overhead salt distributor. The glassware may be positioned on a horizontally spinning rack so that molten salt continuously fills up and empties from the glassware. The molten salt is recycled from the bottom of the apparatus and may be replenished by adding salt to the recycle stream.

35 Claims, 5 Drawing Figures

PROCESS AND DEVICES FOR HARDENING OF GLASSWARE BY ION EXCHANGE

BACKGROUND OF THE INVENTION

The invention relates to a process and to devices for chemically hardening glassware, preferably hollow glassware, by the exchange of alkali ions between the surface of the glass and molten alkali salts.

Productivity arrangements according to the immersion process require large expenditures for the device. One is forced to work with relatively large amounts of molten salts, thereby requiring extensive safety precautions. This results in limitations to the economy of the process together with the resulting unsatisfactory degree of utilization. Certain solutions of the immersion process have the disadvantage that a reduction of compressive stress, developed in the surface layer which is caused by relaxation processes, occurs when the glassware remains within the furnace after removal from the salt bath or when moving from one bath to another. Processes where the glass products are sprinkled with molten salts show advantages because they lower expenditures for the device and are coupled with considerable improvement in degree of utilization.

No solutions have yet been proposed for the process of hardening hollow glassware products by rinsing with molten salt. Known proposed processes and devices concern only the treatment of plate glass or similar products. None of the proposed processes contain entire solutions for the processes and and devices, (such as by circulation of the molten salt), for the regulation of the salt stream, for insuring uniform wetting of the glassware and for the conveying devices. No economic solution for small glassware has been presented.

The object of the invention is to find possibilities for widening the use of ion exchange treatment of glassware and to improve the economy of such processes. The invention is based upon the task to chemically harden hollow glassware by rinsing with a molten salt and to propose complete solutions for devices used in the process.

SUMMARY OF THE INVENTION

It was found that hollow glassware can be produced of identical or improved hardening as in the immersion process when only the outer planes are exposed to salt treatment and when the products are rinsed while their openings point downwardly; rinsing with the molten salt occurs at jet distances between 8 and 50 mm and at rinsing densities between 5 ml/dm$^2$ and 500 ml/dm$^2$, so that an uninterrupted salt film is produced, having thicknesses between 0.05 and 0.5 mm and forming a continuous layer exposed to compressive stress. Furthermore, it was found that the tendency of molten salts to creep may be used for limited ion exchange at the inner surface when this surface is not directly exposed to the salt.

Compressive stress of inner surfaces of hollow glassware, having sufficiently large openings may be obtained, while being subjected to the treatment conditions of the outer surfaces, by rinsing according to the invention, by simultaneously turning or sloughing around a horizontal axis, and by filling the glassware either totally or partially full, followed by emptying. This procedure also serves to supply the inner surfaces with salt film sufficient for limited ion exchange.

Small planar glassware or planar hollow glassware may be correspondingly hardened by sloughing back and forth around a horizontal axis under the salt stream or by turning around such an axis.

According to the invention, the density of the rinse is regulated by dividing the stream of salt into a main rinse line and a recycle line. The overflow at the recycle line has to be regulated according to the need for salt and the output of the pumps.

High efficiency of the lehr for conventional hollow glassware and similarly small glass products is obtained by intermediate distributors catching the salt and rinsing the salt uniformly. Each layer of the products is exposed to such an intermediate distributor. The salt cascade resulting from this arrangement results in uniform treatment conditions for all layers of glassware.

The salt treatment may occur in a known manner by itself or under the influence of certain gases and/or vapors favoring ion exchange, such as $CO_2$, $O_2$ in gas mixtures, or $H_2O$. The influence of these gases or vapors may be immediately applied in the rinse line. It is also possible to supply the molten salt on the recycle line, additionally or exclusively with the gases. Complete or partial regeneration may be undertaken when needed for a particular molten salt on the recycle line by known methods.

According to the invention, the circulating molten salt presents the opportunity of actuating heat transmission and partial or complete tempering of the glass by means of the molten salt.

Salt treatment of the glassware may occur in consecutively arranged segments incrementally or continuously, in which case molten salts of differing compositions and/or differing temperatures may be used. Treatment may also occur as a discontinuous process.

A device for the execution of the process is set up according to the invention in a manner such that a pump is arranged for movement of salt, a cascade of salt flows out of intermediate distributors for rinsing, and a recycle system is disposed parallel to the rinsing line. These devices are arranged within the system between the salt distribution required in the upper portion of the treatment space and a catch basin required at the bottom. Perforated plates in the container serve as intermediate distributors for retaining the glassware. The containers, secured one above the other, are moved while mounted upon L-shaped conveyor waggons through a furnace arrangement surrounding the treatment space. The conveyor waggons consist surrounding the treatment space. The conveyor waggons consist of vertical frames, running upon rails outside the furnace. Crossbars, protruding above the salt receiving container into the furnace space are lattice-shaped and flanged to the lower portion of the frames.

A second system for the execution of the process is arranged according to the invention by disposing a pump for conveying the salt, a cascade constructed out of intermediate distributors for rinsing, and a recycle system parallel to the rinse line within the salt circulation between the salt distribution means required in the upper portion of the treatment space and the catch basin required in the lower portion. In the same area, pivoting racks are driven through individual segments of the cascades in order to accept glassware. The supports for hollow glassware are constructed in such a manner that the axis of the glasses extends vertically to the axle of the pivoting racks.

For an incremental or continuous process, the conveyor waggons, furnished with glassware, or the similarly loaded pivoting racks, initially run through a preheating zone, then through the salt treatment zone consisting of one or more salt revolving units, and if so needed, through a cooling zone. Here the molten salt is delivered from above to the conveyor waggons or the pivoting racks. The construction of the intermediate distributors and the regulation of the rinsing path allow adaptation of the density of the rinse to the requirements of the process. Preheating and cooling confines are not subjects of the invention.

Details of the execution of the invention are described in the examples of execution.

DETAILED DESCRIPTION OF PREFERRED EMBODIMENTS

Figure 1:
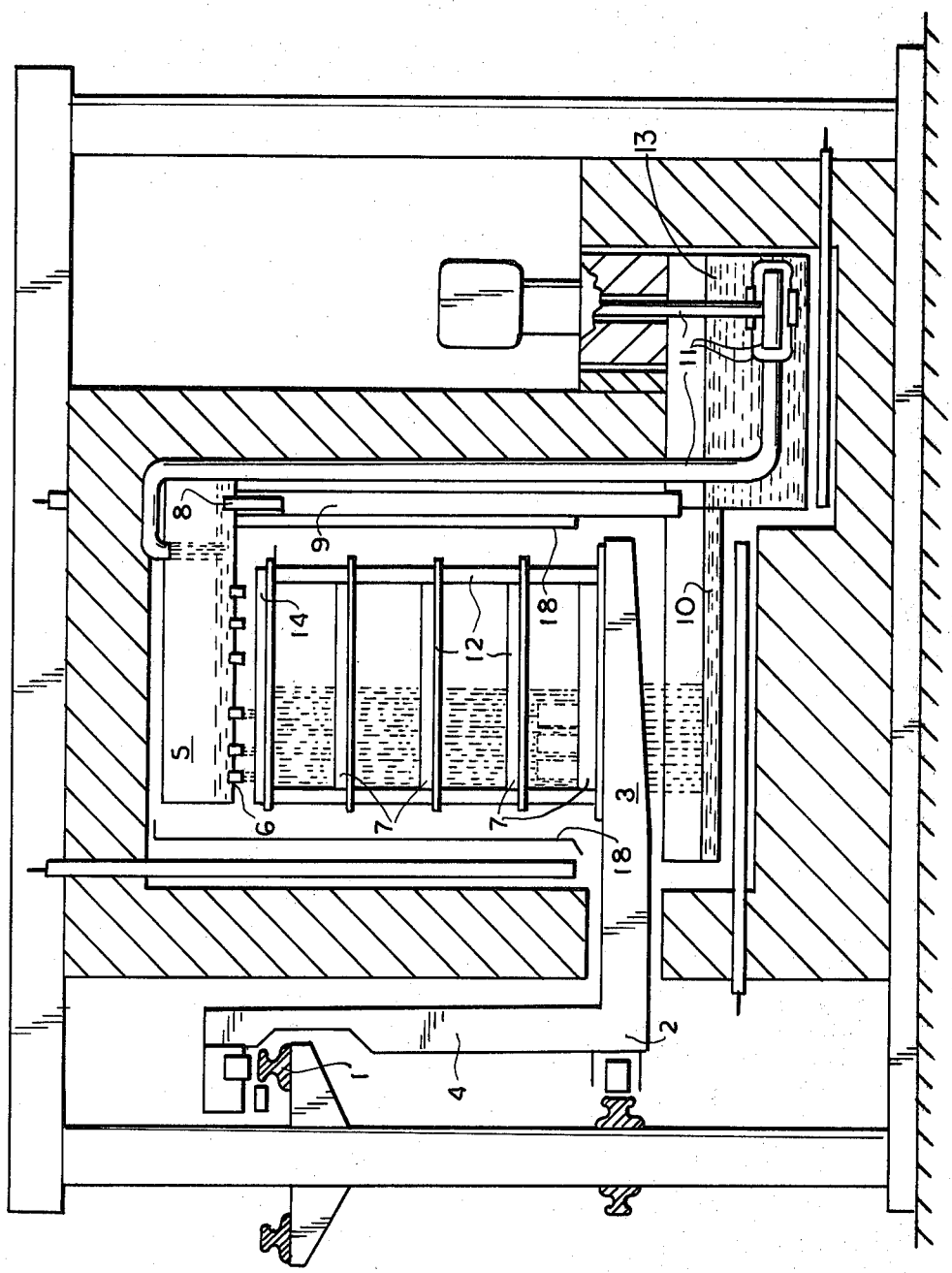
FIG. 1 is a front elevational view of the device according to the present invention, partially in section.

FIG. 1 illustrates one of the arrangements recommended for the execution of the process, corresponding to the aforementioned general solution of the device. Besides an illustration of the lehr and of the electrical heating elements as well as of the support racks, which are not the subject of the invention. FIG. 1 contains all elements needed for the execution of the proposed process and the proposed solution of the device problem.

The salt circulation device consists of the distributor 5, the outlets 6 pertaining to the distributor, the intermediate distributors 7 and 14 which form the main rinse path, the catch basin 10, the pump sump 13, arranged at the sides of the catch basin 10, the pump unit with the ascending pipe 11 and the recycle system, arranged parallel to the rinse path and consisting of the main recycle pipe 9 and the overflow pipe 8. The salt conveyed from the laterally arranged pump sump 13 by pump 11 through the ascending pipe into the salt distributor 5, passes through outlets 6 upon the perforated sheet metal plates 14, from there over the first layer of glassware upon the top perforated sheet metal plates 7, and in the same manner consecutively over the whole container staple filled with glassware in cascades. The number of container layers disposed over one another may be varied within wide limits, conforming to the dimensions of the products to be treated.

FIG. 1 illustrates as an example a submerged pump operating according to centrifugal principles. It is practical to construct this pump in two categories. One category embraces the impeller, the pump cover, the drive shaft, the mounting and the main drive. The portion containing the rotating parts may be constructed in such a manner that they may be exchanged even when the sump is filled with molten salt. It is particularly advantageous to provide a sliding bearing, lubricated by the molten salt, for mounting the drive shaft within the pump cover. The ascending pipe extends from within the inner heated portion of the lehr to the intermediate distribution means. A one-step or multi-step compressed air pump (gas feed pump, air lift pump) instead of the centrifugal pump may be used for conveying the molten salt without any significant change in the illustrated conveyance devices. This pump may also serve not only for conveying salt but also when needed for introducing gases into the molten salt.

A compressed air container may be disposed in the pump sump instead of the centrifugal pump to urge the molten salt by means of compressed air through the ascending pipe into the salt distributor with an appropriate regulating means of inlet and outlet valves. Here, intermediate containers for buffering of the salt stream may also be built into the ascending pipe or at its outlet.

Finally, it is possible and it is herewith proposed to replace the centrifugal pump by a bucket elevator for raising the salt from the sump 13 into the salt distributor 5.

In order to regulate the salt stream along the rinse path, a recycle pipe 9 is arranged between the salt distributor 5 and the catch basin 10. An overflow pipe 8 may be vertically adjusted inside this recycle pipe 9 and may be fixed at a predetermined height. The overflow pipe regulates the height of fluid in the salt distribution means and thereby regulates the amount of salt passing through the outlet pipes.

The salt distribution means contain at least 4, preferably 40, and a maximum of 80 short pipes over one square meter at the bottom which represent the outlets. The cross sections of the outlets have to be chosen in regard to the number of outlets and in regard to the passage of salt so that the molten salt is dammed up by at least 20 mm in the salt distribution means.

Figure 2:
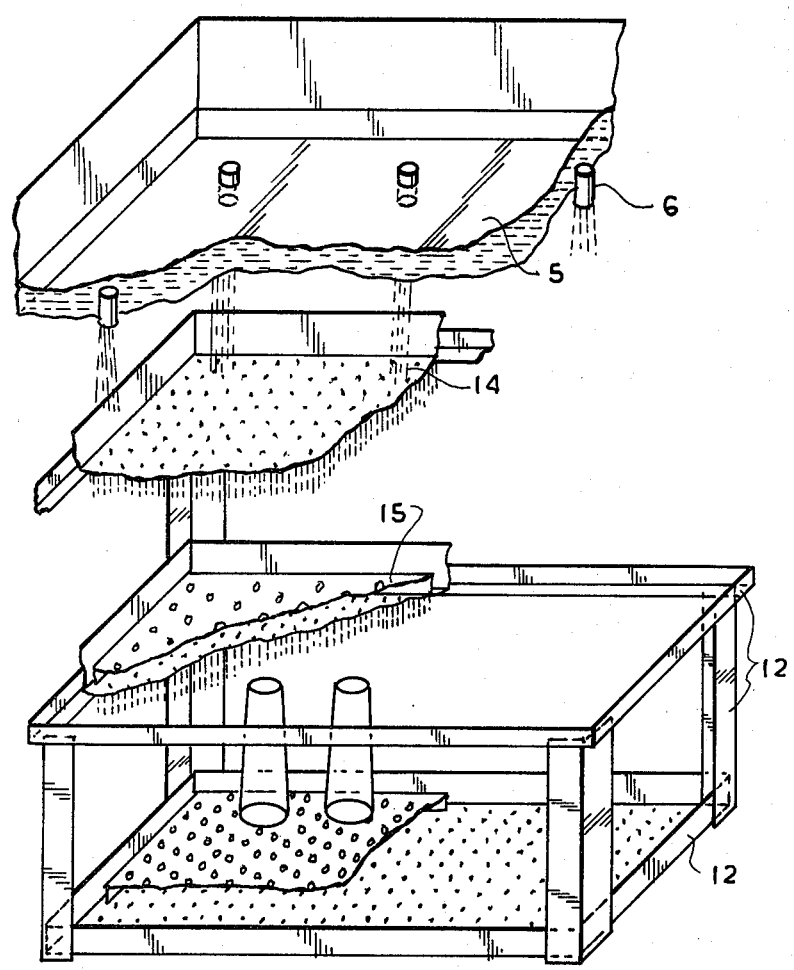
FIG. 2 is a partial broken view of a salt distribution means and intermediate distributors according to the present invention.

FIG. 2 is a partial illustration of a portion of salt distributor 5 with outlets 6, besides a portion of the top layer of containers with the perforated sheet metal plate 14 and container 12 in the second layer as seen from above. Also illustrated are perforated intermediate plates 15 upon which the hollow glassware is placed with openings facing downwardly. The perforated metal sheets 14 and the perforated bottom sheets 7, pertaining to individual containers, contain 500 to 5000 holes of 1 mm to 5 mm diameter per square meter, preferably 2500 holes per square meter having 3 mm diameters which are staggeredly arranged at equal distances between two individual holes. The containers 12, serving to house glassware, are structured to be stacked along their upper and lower edges. By the introducing of stackable intermediate fixtures, the distances between the intermediate distributors may be adapted to the measurements of the glassware. The perforated intermediate plates 15 have to be arranged above the perforated bottom metal sheet 7 at distances between 5 mm and 40 mm, preferably 20 mm.

The conveyor device for moving the container stock through the zone or zones of salt treatment is illustrated in FIG. 1. A conveyor waggon 2 is used, for conveyance with vertical frame 4 running upon rails 1, which are disposed upon the support frame of the device and whose horizontal raster-shaped extension arm 3 is flanged onto the lower portion of the frame. The extension arm supports the stock of containers. A particular feature of the conveyor device is that no mutually movable parts are located within the salt treatment space.

The extension arm 3 is introduced through an aperture in the lower portion of the furnace sidewall into the furnace above the catch basin 10. The slot shaped aperture in the lateral wall of the furnace through which the extension arm slides while moving, is arranged in such a manner that disturbances of the temperature system by the leaking in of external air may be kept to a minimum. The extension arm 3 is provided with an insulating heat repelling element at the intersection with the furnace wall. A labyrinth seal is disposed between the outer plate of the furnace and extension arm 3.

In order to facilitate loading and emptying of the extension arm, the extension arm is provided with a dismountable grid-like pallet for accepting the containers in its frontal portion. It is practical to shape this pallet in such a shape so that it might be used outside the lehr as a means of conveying the container stocks.

Partitions consisting of thin metal sheets are hung onto the container stocks corresponding to individual conveying waggons in a direction across from the direction of the conveyor and reaching almost to the inner edges of the free lehr space. These partitions extend through the lehr space as coextensive barriers and provide efficient separation of individual sections of the treatment zone and other zones in the whole lehr.

The furnace construction includes necessary devices for heating in front of the treatment zone. Means for cooling behind the treatment zone, if so needed, may be constructed as a linear furnace or an annular tunnel furnace with one or more salt circulation means. It may be provided for intermittent, incremental or continuous work. The process and the proposed solutions for devices are also capable of operating intermittently. Such single furnaces may also contain additional furnace segments for preheating and for cooling. It is also possible, though, to use the main treatment space for preheating and post-cooling by interrupting the salt stream.

Figure 3:
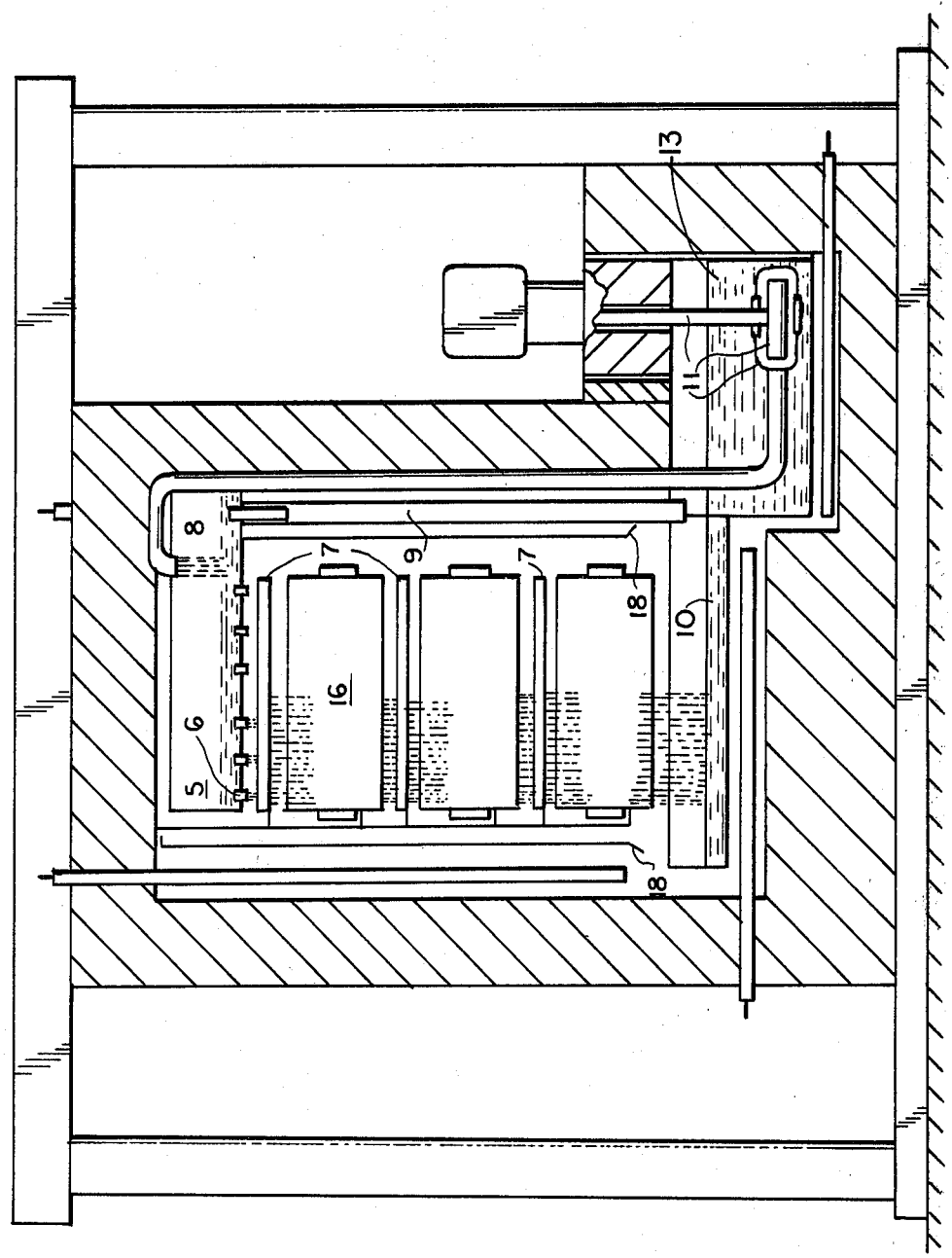
FIG. 3 is a front elevational view of another device according to the present invention, partially in section.

FIG. 3 illustrates another installation allowing the execution of the process, corresponding to the already mentioned solution of the problems of the device. In this construction the salt circulation is formed, as previously explained, by the salt distribution means 5, the outlet pipes 6, the intermediate distributors 7, the salt catch basin 10, the pump sump 13, the construction group consisting of pump and ascending pipe 11 and finally the recycle pipe 9 with the overflow pipe. The salt distributors 7 are represented by intermediate plates with perforated sheet metal bottoms and are integral parts of the furnace. The perforated sheet metal bottoms correspond to the perforated sheet metal bottoms of the container or the perforated sheet metal 14, respectively. Roller-shaped rotary racks 16 are passed through the furnace between or respectively underneath of individual intermediate distributors, serving to furnish the salt rinse. The racks 16 are upheld by corresponding supports and turn or roll while passing through the furnace.

Figure 4:
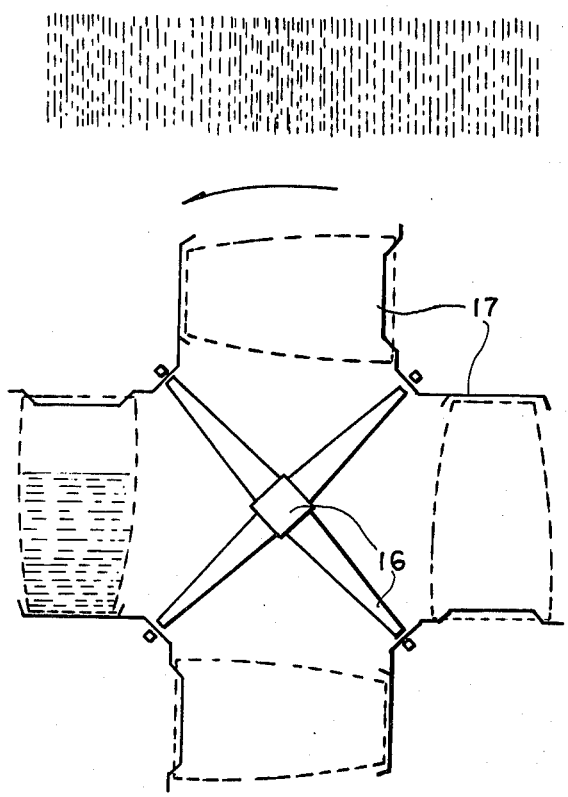
FIG. 4 is a sectional view through a rotary rack in the device of the present invention.

FIG. 4 illustrates a section through a rotary rack 16 to which individual glassware is fastened by clamps or straps 17 perpendicular to the rotary axis. While the glassware, revolving due to the rotation of the rotary rack, moves through the salt treatment segment, the molten salt runs into a portion of the fastened glassware and runs out of another portion. By regulating the density of the rinse and the number of rotations, it is possible to fill the glassware partially or fully during one rotation and to wet all segments of the inner wall of the hollow glassware with salt to an extent that at least a limited ion exchange may take place.

The rotary racks may be advantageously built so that rotation is initiated by displacing the point of gravity due to the circulating salt. Such a solution makes it possible to forgo expensive machinery for externally turning the racks. Conveying the rotary racks through the treatment space may be actuated with or without this use of displacing the point of gravity. It may also be accomplished from outside by any practical conveyance device, for instance by connecting rods, chains for entraining or similar devices.

Figure 5:
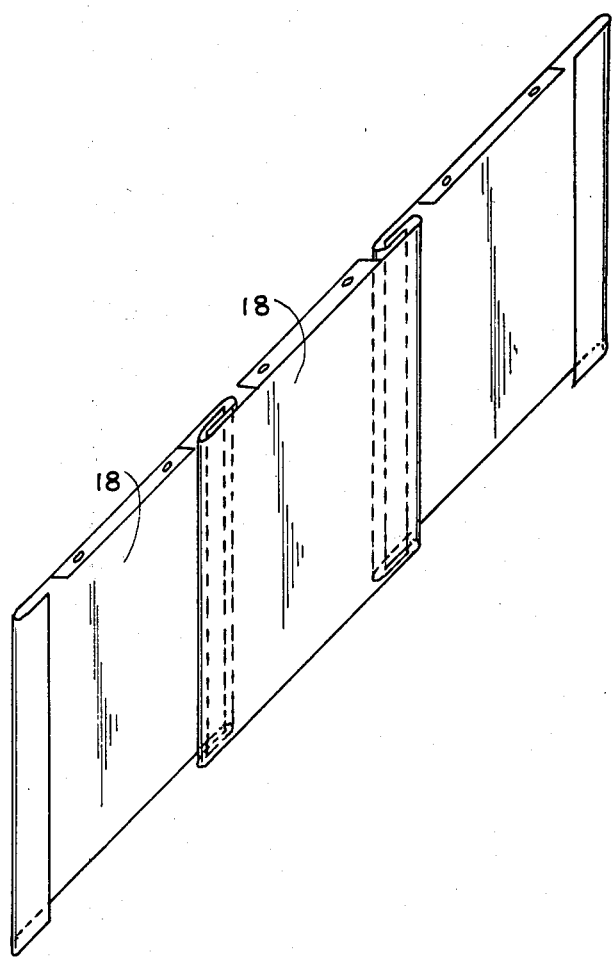
FIG. 5 is a perspective view of a series of aprons in the device of the present invention.

Both illustrated embodiments contain as a special element in the upper portion of the furnace between the heating element and the main treatment space, aprons 18 which catch salt splashes for conveying into the catch basin, but which do not impede the conduction of heat (see FIG. 5).

We claim:

1. An apparatus for hardening glassware by ion exchange, comprising:
    (A) a molten salt distributor at the top of said apparatus,
    (B) a series of intermediate perforated salt distributors arranged at discrete intervals underneath said salt distributor (A), to evenly regulate the cascade of molten salt from said initial salt distributor (A),
    (C) a device for passing said glassware between said intermediate distributors (B) to evenly rinse said glassware with said molten salt,
    (D) a catch basin for said molten salt underneath said intermediate salt distributors, and
    (E) means for recirculating said molten salt from said catch basin (D) to said salt distributor (A).

2. The apparatus of claim 1 in which said recirculating means (E) comprises a pipe for recirculating molten salt to said salt distributor (A).

3. The apparatus of claim 2 in which said pipe in said recirculating means (E) additionally comprises an overflow pipe.

4. The apparatus of claim 3 in which said recirculating means (E) comprises at least one of a centrifugal pump, a pneumatic pump, and a compressed air supply to recirculate said molten salt.

5. The apparatus of claim 4 in which said centrifugal pump is submerged in said catch basin (D), with a vertical shaft.

6. The apparatus of claim 5 in which said centrifugal pump comprises
    (1) a pump housing,
    (2) a pipe within said housing (1) extending upwardly, and
    (3) a unit containing rotatable parts comprising an impeller, a pump cover, a drive shaft, and a drive mounting, said unit interchangeable underneath molten salt.

7. The apparatus of claim 6 in which said drive shaft extends through a slidable bearing connected to said pump cover and lubricated with molten salt.

8. The apparatus of claim 1 in which said recirculating means (E) comprises a container lift.

9. The apparatus of claim 1 in which the conveying device (C) comprises a series of extension arms supporting the glassware as it moves through said apparatus.

10. The apparatus of claim 9 in which the glassware is supported in perforated containers which in turn are supported by said extension arms.

11. The apparatus of claim 10 in which said perforated containers each contain between 500 to 5000 holes per square meter arranged equidistantly in staggered rows, said holes from 1 to 5 mm in diameter.

12. The apparatus of claim 11 in which said perforated containers each contain about 2500 holes per square meter, said holes about 3 mm in diameter.

13. The apparatus of claim 11 in which said extension arms are all rigidly connected to a frame which is in turn connected to a running track outside of the apparatus.

14. The apparatus of claim 11 in which each extension arm of said conveying device (E) is provided with an insulating element and labyrinth seal at the edge of said apparatus to retard heat transmission.

15. The apparatus of claim 14 in which each extension arm additionally comprises a removable pallet for supporting the individual containers.

16. The apparatus of claim 15 in which said conveying device (E) additionally comprises a perforated, intermediate plate positioned from 5 to 40 mm above the bottom of each container to support said glassware.

17. The apparatus of claim 16 in which said perforated, intermediate plate is positioned about 20 mm above the bottom of each container.

18. The apparatus of claim 1 in which said salt distributor (A) comprises at least four pieces of pipe in its bottoms for distributing salt.

19. The apparatus of claim 18 in which said salt distributor (A) comprises no more than 80 pieces of pipe to dam up the salt to a depth of at least 20 mm within the salt distributor (A).

20. The apparatus of claim 19 in which said salt distributor (A) comprises about 40 pieces of pipe.

21. The apparatus of claim 1 in the form of a linear furnace for intermittent rinsing of glassware with molten salt.

22. The apparatus of claim 1 in the form of an annular furnace with a series of elements (A)-(E) to incrementally treat glassware.

23. The apparatus of claim 1 additionally comprising an initial means for heating the glassware before the salt rinse and means for cooling the glassware after the salt rinse.

24. The apparatus of claim 1 in which said conveying device (C) comprises a series of rotational racks on which said glassware is mounted with the axis of said glassware perpendicular to the axis of rotation so that molten salt is continuously flowing into and out of said glassware as the glassware rotates.

25. The apparatus of claim 1 additionally comprising meshing aprons to deflect stray splashes of salt back into the catch basin (E).

26. A process for hardening glassware by ion exchange, comprising the steps of:
   (A) arranging said glassware in a plurality of levels on a means for conveying said glassware through a stream of molten salt,
   (B) passing said glassware through a stream of molten salt, said stream of molten salt originating from jets disposed between 8 mm and 50 mm from each other, causing a rinse density between 5 ml/dm$^2$ and 500 ml/dm$^2$, and creating an unbroken salt film between 0.05 mm and 0.5 mm on the outer surface of said glassware, and
   (C) recycling said molten salt.

27. The process of claim 26 in which said glassware is arranged on said conveying means with openings of said glassware pointing downwardly.

28. The process of claim 26 in which said conveying means comprises a series of rotational racks for rotating said glassware through the stream of molten salt so that the openings in said glassware alternately point towards and away from the oncoming stream of salt.

29. The process of claim 26 in which said molten salt is allowed to creep over the surfaces of glassware not brought directly into contact with said salt stream so that a limited ion exchange may take place on such surfaces of the hollow glassware not directly contacting said salt stream.

30. The process of claim 28 in which said glassware is alternately filled and emptied of molten salt.

31. The process of claim 26 additionally comprising the step of introducing gases and/or vapors to enhance ion exchange on the glassware.

32. The process of claim 26 in which molten salt is resupplied at the step of recycling (C).

33. The process of claim 26 conducted continuously.

34. The process of claim 26 conducted intermittently.

35. The process of claim 26 conducted incrementally.

* * * * *